July 10, 1951 J. F. BYRD ET AL 2,560,212

RESILIENT SOCKET ASSEMBLY

Filed March 31, 1948

Inventors
JOHN F. BYRD &
PAUL W. WILDOW

By [signature]
Attorney

Patented July 10, 1951 2,560,212

UNITED STATES PATENT OFFICE 2,560,212

RESILIENT SOCKET ASSEMBLY

John F. Byrd, Ashland, and Paul W. Wildow, Moorestown, N. J., assignors to Radio Corporation of America, a corporation of Delaware Application March 31, 1948, Serial No. 18,128

1 Claim. (Cl. 173—328)

This invention relates to improvements in resilient socket assemblies, and more particularly to a resilient socket assembly for mounting vacuum tubes on the chassis of electronic equipment.

It is well known that if vacuum tube sockets are mounted rigidly on the chassis of the equipment with which they are associated, chassis vibration may cause fluctuating voltages or "microphonics" to be produced and amplified in the tubes carried by the sockets and in associated circuits. Resilient or floating socket mounts are therefore desirable in order to eliminate such effects.

It is obvious that if such floating mounts are provided for the tube sockets, the connecting leads from such sockets to other circuit points must be flexible in nature to permit the desired relative movement between the socket and the chassis. However, it has been found that such flexible leads are inconvenient to handle in soldering and other circuit assembly operations, and that assembled circuits in which flexible leads are used are not as neat in appearance as those employing rigid wiring.

Floating socket mounts have been proposed previously in which a resilient cushion was provided between the socket and the supporting chassis. One objection to prior art devices of this nature has resided in the fact that the combined mass of tube and socket is often insufficient to overcome the mass of the cushion, and hence no relative movement results between the socket and the chassis when the latter vibrates.

It is a principal object of the present invention to provide an improved resilient mounting assembly for vacuum tubes.

It is a further object of the invention to provide an improved resilient tube mounting assembly adapted for use with rigid circuit wiring in electronic equipment.

Another object of the invention is to provide an improved resilient tube mounting assembly which will furnish adequate shock protection for extremely light-weight sockets and tubes.

According to the invention, these and other objects and advantages are attained in an assembly including a mounting plate, a tube socket fixed to the mounting plate, resilient mounting elements positioned on the mounting plate through the medium of which the plate is held in position, and a terminal board mounting on the mounting elements and held in position adjacent the socket.

Figure 4:
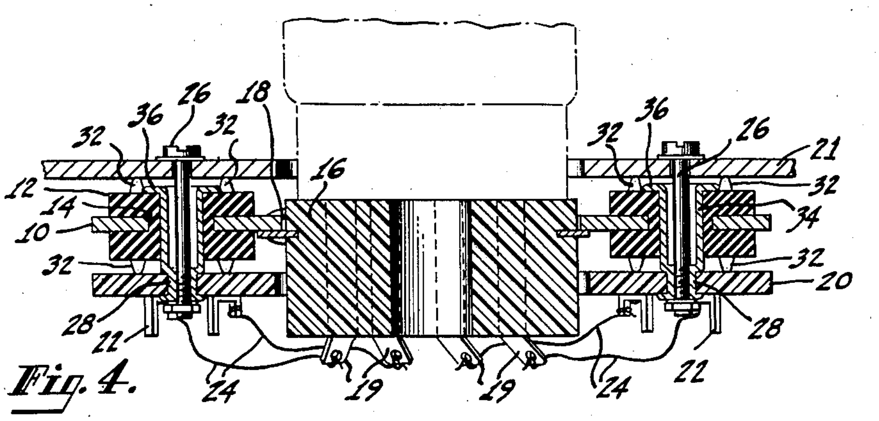
Figure 5:
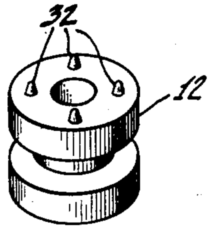
Figure 6:
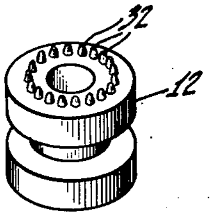

In an important modification, the invention provides a resilient mounting for sockets which are relatively light in weight, in which projecting spacers on the surfaces of the mounting elements are given a mass sufficiently small to permit the desired relative movement between the tube mount and the chassis. A more complete understanding of the invention may be had from the following description of illustrative forms thereof when read in connection with the accompanying drawing in which, Fig. 1 is a top plan view of a resilient socket assembly, Fig. 2 is a side elevation, partly in section on the line 2—2 of Fig. 1, showing the assembly in position on a supporting chassis, and including the base portion of a vacuum tube mounted in the socket, Fig. 3 is a bottom plan view of the assembly, Fig. 4 is a sectional view of a modified form of resilient socket assembly, including a portion of the supporting chassis, and Figs. 5 and 6 are perspective views of modified forms of resilient mounting grommets similar to those shown in Fig. 4.

Figure 1:
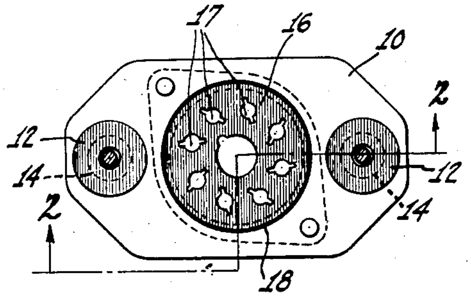
Figure 2:
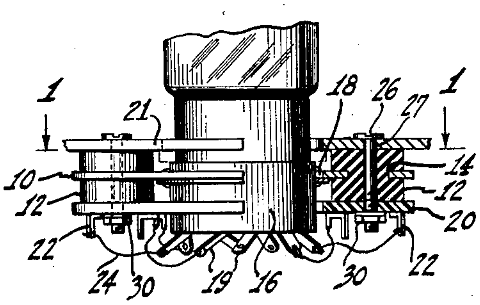
Figure 3:
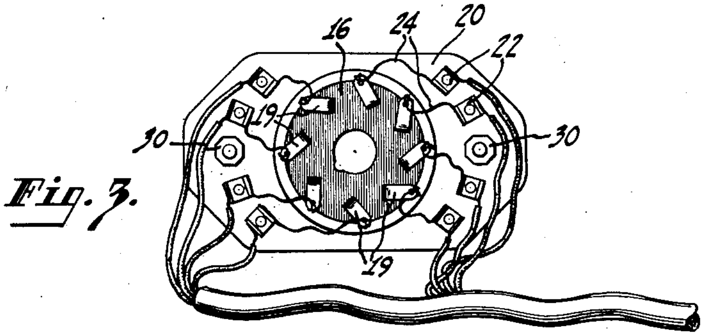

In the form of the invention shown in Figs. 1 to 3, the assembly is seen to include a mounting plate 10 having resilient mounting grommets 12 of soft rubber or the like placed in apertures 14 at each end of the plate 10. A tube socket 16 of any desired type having the usual tube pin holes 17 and associated contacts 19 is mounted on the plate 10 and extends through an opening 18 in the plate 10.

A terminal board 20 is included as part of the assembly and is seen to consist of a section of insulating material corresponding in shape to the plate 10. The terminal board is provided with terminal posts 22 which are connected to the tube pin contacts 19 of the tube socket by short, flexible leads 24. Hence, the assembly is well adapted for use with rigid circuit wiring since the flexible leads 24 permit relative movement between the tube socket and the chassis 21, while rigid wires may be run to the terminal posts 22 as desired.

The entire assembly is held in position on the supporting chassis 21 by mounting bolts 26 which extend downwardly through holes 27 in the chassis, through the grommets 12, and through holes 28 provided therefor in the terminal board. When the nuts 30 are turned up against the underside of the terminal board, it will be seen that the terminal board is held against, and in effect mounted on, the grommets 12, and that the mounting plate 10 is resiliently held between the chassis 21 and the terminal board through the medium of the grommets. Thus, the mounting plate is effectively given a floating mount between the terminal board and the chassis, and the tube socket and its tube are effectively isolated from chassis shocks and vibration.

In Fig. 4, we have shown a modified form of resilient socket assembly which is particularly adapted for use with lightweight tubes and sockets. In this modification, which is generally similar to the assembly shown in Figs. 1 through 3, the mounting grommets 12 are provided with a plurality of projecting spacers 32 which constitute the points of contact between the grommets and the chassis, and between the grommets and the terminal board. The spacers 32 are preferably located at symmetrically spaced points equidistant from the center of the grommets, and should be so shaped as to deform readily under any condition of chassis shock or vibration. The tapered form of spacers shown in Figs. 4 through 6 has been found to be suitable for this purpose, although it is obvious that other configurations may be adopted which will produce equally good results. Figs. 5 and 6 show possible alternative arrangements of the spacers, with Fig. 5 depicting four spacers located at diametrically opposed points, while Fig. 6 shows a substantially continuous ring of spacers.

With this form of the invention, it is convenient to use tubular rivets 34 for mounting the terminal board 20 as shown in Fig. 4. When assembled, the lower ends of the rivets 34 are locked in the holes 28 provided in the terminal board. The rivets extend upwardly through the grommets 12 and terminate in retaining flanges 36 which rest upon the upper surfaces of the grommets.

As in the case of the assembly previously described, flexible leads 24 are connected between the socket contacts 19 and the terminal posts 22.

While we have shown and described certain specific forms of the invention for the purpose of simple disclosure, it is obvious that many changes could be made without departing from the scope or spirit of the invention. Therefore, the foregoing description is to be construed as illustrative, and not in a limiting sense.

What is claimed is:

In a socket assembly adapted to be mounted on a supporting chassis, the combination of a mounting plate having apertures therein, resilient mounting grommets disposed in said apertures and having a plurality of substantially pointed projecting spacers on the surface of said grommets, said spacers being adapted to provide a plurality of substantially point contacts between said grommets and said chassis, a vacuum tube socket secured to said plate, a terminal board for said socket, and tubular rivets secured to said terminal board and extending through said grommets, certain of said spacers further providing a plurality of substantially point contacts between said grommets and said terminal board.

JOHN F. BYRD.
PAUL W. WILDOW.

REFERENCES CITED

The following references are of record in the file of this patent:

UNITED STATES PATENTS

| Number | Name | Date |
|---|---|---|
| 1,496,768 | Booth et al. | June 10, 1924 |
| 1,571,964 | Perlesz | Feb. 9, 1926 |
| 1,587,120 | Haddock | June 1, 1926 |
| 1,642,517 | Taylor | Sept. 13, 1927 |
| 2,024,547 | Strongson | Dec. 17, 1935 |
| 2,195,180 | Marzetti | Mar. 26, 1940 |
| 2,375,105 | Hile | May 1, 1945 |
| 2,425,654 | Storch | Aug. 12, 1947 |

FOREIGN PATENTS

| Number | Country | Date |
|---|---|---|
| 233,614 | Great Britain | May 14, 1925 |
| 237,921 | Great Britain | May 20, 1926 |
| 503,676 | Germany | July 24, 1930 |